Dec. 29, 1942.   J. MORKOSKI   2,306,744
CULTIVATOR ATTACHMENT
Filed July 20, 1940   3 Sheets-Sheet 1

Inventor
James Morkoski
by Paul O. Pippel Atty.

Dec. 29, 1942.  J. MORKOSKI  2,306,744
CULTIVATOR ATTACHMENT
Filed July 20, 1940   3 Sheets-Sheet 2

Inventor
James Morkoski

Dec. 29, 1942. J. MORKOSKI 2,306,744
CULTIVATOR ATTACHMENT
Filed July 20, 1940 3 Sheets-Sheet 3

Inventor
James Morkoski
By Paul O. Pippel Atty.

Patented Dec. 29, 1942

2,306,744

UNITED STATES PATENT OFFICE 2,306,744

CULTIVATOR ATTACHMENT

James Morkoski, Canton, Ill., assignor to International Harvester Company, a corporation of New Jersey Application July 20, 1940, Serial No. 346,565

10 Claims. (Cl. 97—47)

This invention relates to cultivator attachments, and more particularly to cultivator attachments utilized in the cultivation of sugar cane crops and the like. Such cultivators are of the type shown in the Graham Patent No. 2,105,117 issued January 11, 1938, and on which the present invention is an improvement.

It is one object of the present invention to provide an improved means for the attachment of the overhanging supporting structure of the tractor wherein strains upon the tractor mid-portion encountered with the supporting structure of the previous form will have been greatly reduced.

It is another object of the invention to provide an improved form of pivoted structure on the supporting structure wherein undue strains are not placed on a transverse shaft forming a part of the pivoted structure, when the main tool-carrying frame is lifted by this pivoted structure on the overhanging supporting structure, which is in turn mounted on the tractor.

It is a still further object of the invention to provide in a cane cultivator attachment a novel means for the attachment of a fluid-actuating cylinder device between the pivoted structure and the tractor.

It is a still further object of the invention to provide in a cane cultivator novel means for the attachment of the working tools to an auxiliary frame carried for free lateral movement on the main carrying frame, and wherein the tools will be so connected to the auxiliary frame that they will fit to cultivate in a hollowed space between the plant rows.

According to the present invention, the supporting structure includes longitudinally extending side members which are adapted to be connected to the top of the rear axle structure of the tractor and to extend forwardly for their anchoring connection with the tractor midway between the rear axle structure of the tractor and its forward portion. With such a supporting structure the tendency for the tractor to rupture midway of its length is greatly reduced. This supporting structure has a pivoted structure which is so designed that only a portion of the force used in lifting the main implement frame is put into the shaft forming a part of the pivoted structure. In other words, the pivoted structure is so designed that the force delivered thereto is distributed so that a part thereof is delivered to the lifting arms removed from their point of connection with the rockable shaft. The entire attachment is arranged for the lifting to be effected by a fluid-actuating device connected between the pivoted structure and the tractor. The attachment to the pivoted structure and to the tractor is particularly adapted to receiving the ends of the cylinder device in a manner whereby the same may be readily attached or removed for repair or for use at another location.

Also, the working tools are connected by means of a V-shaped tool bar to an auxiliary frame, which is in turn connected to the main tool-carrying frame for lateral shiftable movement. By this means, the working tools can be arranged for their adaptation within the hollowed space between the plant rows.

For other objects and for a better understanding of the invention reference may be had to the accompanying drawings, in which.

Figure 1:
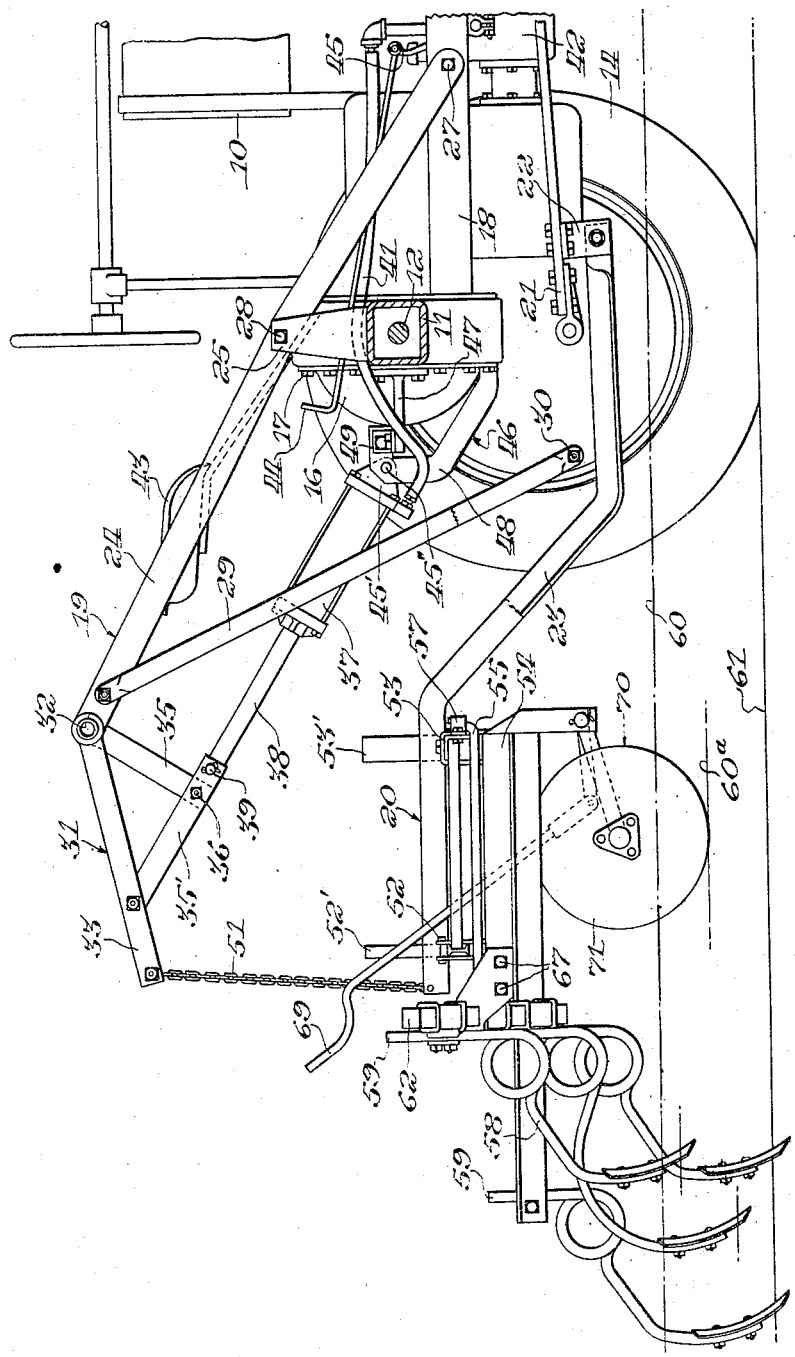
Figure 1 is a view in elevation of the rear portion of a tractor with the cultivating attachment including the features of the present invention attached thereto.
Figure 2:
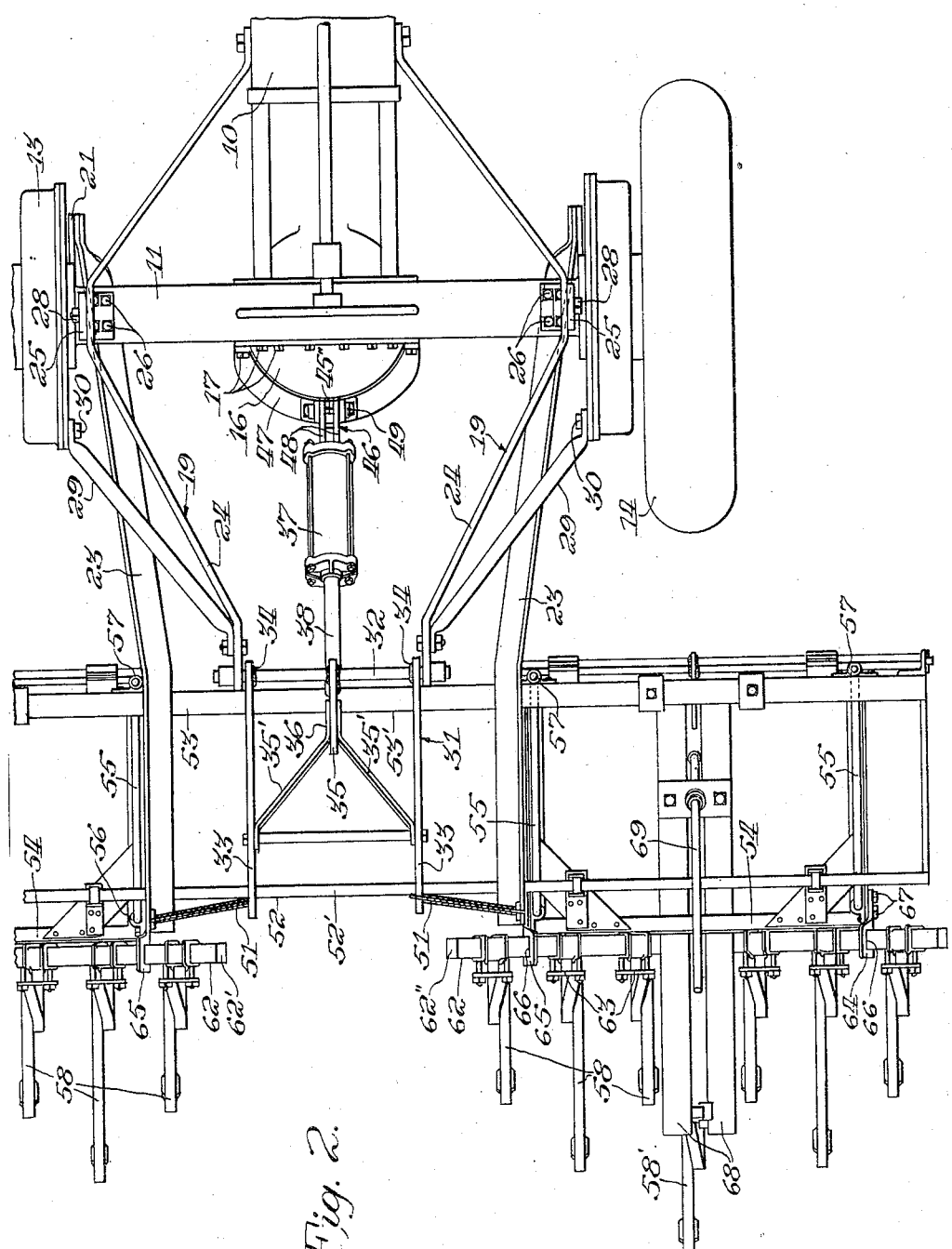
Figure 2 is a plan view of the rear portion of the tractor and of a portion of the attachment and illustrating the central location of the cylinder device.

Referring now to the figures, there is shown a tractor of cast body construction indicated generally at 10 having a transverse rear axle housing 11 in which is disposed a rear axle 12 that extends laterally for connection through the depending housing 13 with the rear drive wheels 14 of the tractor. This rear axle housing 11 is enlarged along its length, as shown at 15, to include a differential mechanism of the tractor, and has a bulging cover 16 attachable to the housing 11 by means of screw bolts 17. The tractor also has a body structure with side portions 18 extending forwardly of the rear axle housing 11.

The cultivating attachment includes generally a supporting structure 19 adapted to overhang the rear of the tractor, and a main tool-carrying frame 20 extending rearwardly and beneath the supporting structure 19. The main frame 20 is pivoted to the usual tractor draw-bar 21 which is mounted to extend forwardly of the rear axle structure and on which are the brackets 22 for the pivotal attachment of longitudinally extening main frame members 23 for vertical movement with respect to the tractor.

The supporting structure 19, which overhangs the rear of the tractor, includes forwardly extending side members 24 adapted to be connected to upstanding brackets 25 mounted on the top portion of the rear axle housing 11 by means of bolts 26 and to extend forwardly beyond the bracket 25 for connection to the side of the tractor at 27 at a location forwardly removed from the rear of the tractor. It was found in the old construction that where the side members of the supporting structure were obliged to carry such heavy loads, upon the tool-carrying frame being raised to transport position on the supporting structure, a rupture of the tractor some place midway between the rear axle housing and the front portion of the tractor occurred. By this feature of the present invention of connecting the side members well forwardly of the rear axle housing of the tractor, breakage midway of the tractor has been eliminated. The side members 24 are fixed to the brackets 25 by means of bolts 28. Extending downwardly from the rear ends of the side members 24 are bracing members 29 which connect respectively with the inner face of the depending housings 13, as at 30.

With the main part of the supporting structure mounted on the tractor, there will now be described the pivoted structure indicated generally at 31, and which is pivotably mounted on the supporting structure. The pivoted structure 31 includes a transversely extending shaft 32 pivotally connected to the rearward ends of the side members 24. On this shaft, there are rigidly secured, as by welding, two spaced lifting arms or members 33. These arms are welded, as indicated at 34, to the shaft 32. Also welded to the shaft 32 midway between the spaced lifting arms 33 is an arm member 35 angled with respect to the lifting arm members 33. Connected to the lifting arms or members 33, at locations removed from their points of connection with the transverse shaft 32, are two link members 35' which extend downwardly and toward the tractor, but converge for their connection with the arm member 35, as indicated at 36, and extend further beyond their point of connection with the arm member 35 to provide means for connection of a fluid cylinder device 37.

The fluid cylinder device 37 includes a piston rod 38 adapted to extend between the spaced ends of the links 35' for connection by means of a pin 39 with the pivoted structure. The fluid cylinder device 37 may receive fluid pressure through a hose connection 41 from a pump source on the tractor indicated generally at 42. This pump source may be controlled from the operator's station 43 by a fore and aft movable control member 44 connected to the arm 45 of the pump and control mechanism 42.

The fluid cylinder device 37 has an attaching portion 45' for a connection to a bracket means 46 attachable to the differential and rear axle housing 11 by means of the bolts 17, which also retain the cover member 16 thereto.

This bracket structure 46 includes a semicircular horizontally extending plate member 47, which extends rearwardly of the rear axle housing 11 to fit about the bulging cover plate 16. The bracket structure 46 also includes two vertically extending members 48, which are spaced apart for the reception of the attaching portion 45 of the cylinder device 37 to be retained by means of a pin 45", and which are further connected to the horizontally extending plate 47 by means of angle bracket members 49. It will be noted that an arrangement has been provided for the ready attachment of a cylinder device to the rear of the tractor and to the pivoted structure wherein detachment may be effected merely by the removal of pin retaining means or the like. It should be noted that the fluid cylinder device 37 extends generally upwardly and vertically and substantially parallel with the side members 24 of the supporting structure 19. By having the cylinder device so arranged, direct action of the same upon the pivoted structure may be obtained.

It should now also be apparent that, when force is applied to the pivoted structure 31 by means of the fluid cylinder device 37, only a portion of that force will be directed through the transverse shaft 32, since there have been provided the link members 35' adapted to act directly upon the lifting arms or members 33. This force will thereby be imparted to the lifting arms or members 33 independently of force imparted to the same through the arm 35. The shaft 32 will now not need to take all of the lifting torque when the pivoted structure 31 is operated. It will take only the torque imparted through the arm 35. By having the link members 35' extend downwardly and beyond their connection with the arm member 35, there has been provided an improved means for the attachment of the piston rod 38 to the pivoted structure 31.

The longitudinally extending members of the main tool-carrying frame 20 extend rearwardly for connection with the pivoted structure 31 by means of chain connections 51, each chain respectively connecting between a lifting arm 33 and a frame member 23. When the fluid cylinder device 37 is operated, the movement of the pivoted structure will be imparted to the main frame 20 through the chain connections 51 to thereby pivot the main frame 20 about the connections of the main frame members 23 with respect to their respective brackets 20 on the tool bar 21 extending forwardly of the rear axle structure.

Figures 3, 4:
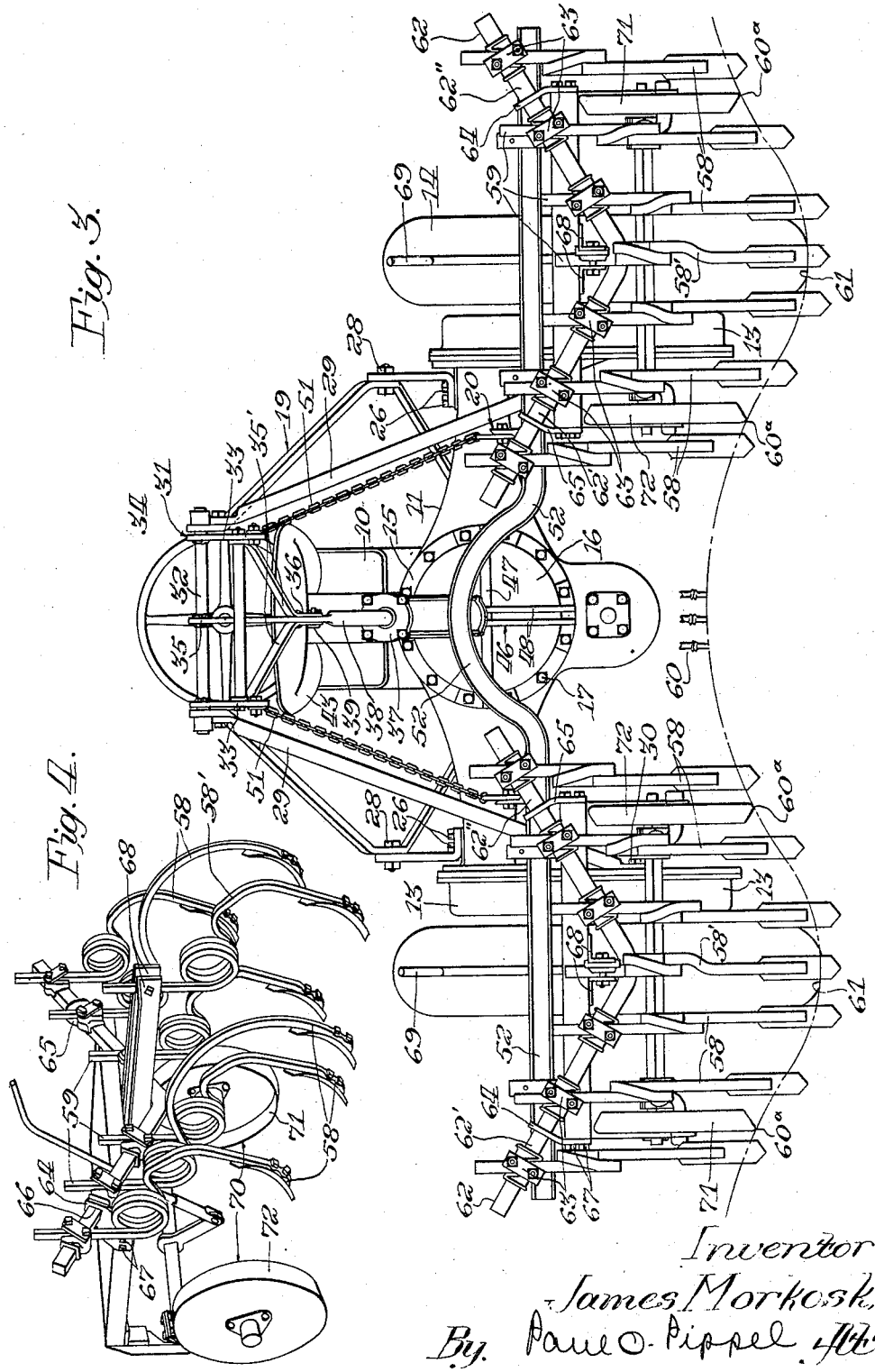
Figure 3 is a rear view in elevation, looking at the rear of the attachment and at the rear of the tractor; and, Figure 4 is a perspective view of the auxiliary frame and illustrating the attachment of the working tools thereto by means of a V-shaped tool bar.

This main frame 20 includes transversely extending members 52 and 53, these members having vertically extending bulges 52' and 53', respectively, in the same, and shown particularly well in Figure 3, to provide clearance for the cane being cultivated. At each side of the main frame 23, there is connected an auxiliary frame, indicated generally at 54, arranged for free lateral movement with respect to the longitudinal members 52 and 53. These auxiliary frames are guided in their lateral movement by means of links 55 pivoted to the auxiliary frame at 56 and to the main frame at 57. The connection of the auxiliary frame 54 and of the members 55 is not a feature of the present invention and may be understood more clearly by reference to the above mentioned patent.

On these auxiliary frames 54, there is to be connected a series of working tools 58 taking the form of spring cultivator shovel elements and having standard portions 59. Since, in the cultivation of cane crops, there is a hollowed space between the plant rows, it is desirable to arrange the laterally spaced cultivating tools 48 in such a manner that the tools will operate at even depth within the hollowed space. Referring particularly to Figure 3, it will be noted that the tractor wheels 14 straddle the cane crop indicated at 60 and that these cultivator shovels work in a hollow furrow space indicated at 61.

As a means for the connection of these cultivator shovels 58 in this manner, there has been provided a tool bar 62 of V-shape and of square cross-section. With the tool standards 59 connected in spaced relation with the tool bar 62 by means of standard clamps 63, and by providing means for the connection of this tool bar 62 to the auxiliary frame 54 so that the apex of the V-shaped bar extends downwardly, arrangement has been provided whereby the tools can be readily arranged for proper cultivation within a hollowed space between the cane rows.

As a means for the connection of the tool bar 62 to the auxiliary frame 54, there has been provided bracket members 65 connected respectively to the respective sides of the auxiliary frame 54. Since the tool bar 62 has a V-shape there is provided therealong the leg portions 62' and 62". Each bracket 64 and 65 has a portion bent to be perpendicular with respect to the respective legs, and through these portions there is provided a squared opening for receiving the squared leg portions of the tool bar 62. This squared opening is shown particularly well, as indicated at 66 in Figure 4. By having such squared openings, it should be apparent that any lateral or rearward twisting of the tool bar will be prevented. When the brackets 64 and 65 are finally attached to the auxiliary frame 54 by means of bolts 67, it should be further apparent that any vertical movement of the tool bar is prevented. Thus, it should be apparent that, by the use of V-shaped tool bars, very simple means is used for the attachment of the working tools and of the tool bar to the auxiliary frame 54.

In addition to the tools 58 on the tool bar, there may also be connected a tool 58' to longitudinally extending members 68 forming a part of the auxiliary frame 54 and between which extends a gauge wheel adjusting crank 69 for regulating the cultivating depth of the tools 58 and 58' by adjustment of a gauge wheel arrangement 70. This gauge wheel arrangement may include a pair of spaced wheels 71 and 72 and, as shown in the Figures 1 and 3, these wheels will travel in along the line 60a on the sides of the cane crop hill 60.

It should now be apparent that there has been provided an improved cane cultivator attachment. While various changes may be made in the structural details of the present invention, it shall be understood that such changes shall be within the spirit and scope of the appended claims.

What is claimed is:

1. In combination, a tractor having a transverse rear axle housing, an overhang supporting structure forming a part of an implement attachment connected to the tractor to extend rearwardly of and above said axle housing and including a structure pivotable on the supporting structure for movement in a vertical plane, a fluid lifting cylinder device connected at one end to said pivotable structure to pivot the same, and bracket means attached to the rear axle housing and serving as a support for the other end of the cylinder device.

2. In combination, a tractor having a transverse differential and rear axle housing, an overhang supporting structure forming a part of an implement attachment connected to the tractor to extend rearwardly of and above said axle housing and including a structure pivotable on the supporting structure for movement in a vertical plane, a fluid lifting cylinder device connected at one end to said pivotable structure to pivot the same, said differential housing including a cover member with attachable means therefor, bracket means to be connected to the housing thereof to serve as a support for the other end of the cylinder device.

3. In combination, a tractor having a transverse differential and rear axle housing, an overhang supporting structure forming a part of an implement attachment connected to the tractor to extend rearwardly of and above said axle housing and including a structure pivotable on the supporting structure for movement in a vertical plane, a fluid lifting cylinder device connected at one end to said pivotable structure to pivot the same, said differential housing including a cover member with attachable means therefor, bracket means adapted to be connected to the housing by the cover attachable means and to extend rearwardly thereof to serve as a support for the other end of the cylinder device, said bracket means including a substantially semicircular shaped member extending horizontally about the cover member and a pair of spaced vertically extending members connected to the horizontally extending member, said fluid cylinder device having a connecting portion adapted to extend into the space between the spaced vertically extending members, and means for removably fixing the cylinder device to said members.

4. In combination, a tractor, a supporting structure forming a part of an implement attachment connected to the tractor, a pivotal structure pivotable on the supporting structure and including a shaft, a pair of arm members rigidly connected to the shaft in spaced relationship with respect to each other and including means for the attachment thereto of a part of the implement attachment which is to be moved by the pivotal structure, a third arm member rigidly connected to the shaft but angled with respect to the first mentioned arm members, link members connected respectively to each of the pair of first mentioned arm members at a location removed from their respective connections to the shaft and to the third arm member, actuating means for rocking said pivotal structure to effect movement of the implement part, and means for connecting said actuating means to said links and said third arm member to distribute the force being imparted to said first mentioned pair of arm members whereby said shaft is not required to take all of the pivoting force being utilized.

5. In combination, an implement-carrying frame, a supporting structure on said frame, a pivotal structure pivotable on the supporting structure and including a shaft, a pair of arm members rigidly connected to the shaft in spaced relationship thereon and including means for the attachment thereto of a part of an implement to be moved by the pivotal structure, an arm member rigidly connected to the shaft between the spaced arm members but angled with respect thereto, spaced link members connected respectively to each of the first mentioned arm members, converging inwardly and connected to said last mentioned arm member, said spaced links extending beyond their point of connection with the arm member, actuating means for pivoting said pivotal structure to effect movement of the implement part and including means adapted to be disposed between the spaced links, means for connecting the same to the spaced links at a point beyond their point of connection with the last mentioned arm member, whereby said spaced links serve to take some of the force being imparted to said first mentioned arm members and as well to retain the actuating means against lateral deflection.

6. In combination, a tractor, a supporting structure forming a part of an implement attachment connected to the tractor, a pivotal structure pivotable on the supporting structure and including a shaft, a pair of arm members rigidly connected to the shaft in spaced relationship with respect to each other and including means for the attachment thereto of a part of the implement attachment which is to be moved by the pivotal structure, an arm member rigidly connected to the shaft but angled with respect to the first mentioned arm members, spaced link members connected respectively to each of the first mentioned arm members and connected to said last mentioned arm member respectively at each side thereof, actuating means for pivoting said pivotal structure to effect movement of the implement part and including means adapted to be disposed between the spaced links, means for connecting the same to the spaced links, whereby said spaced links serve to retain the actuating means against lateral deflection and as well to take some of the force being imparted to said first mentioned pair of arm members.

7. In combination, a tractor cultivating implement attachment comprising an overhanging supporting structure, a main frame structure pivoted to the tractor and connected to the supporting structure to be lifted therefrom, an auxiliary frame directly connected to said main frame for free lateral movement to follow the hollowed space between plant rows, and means for connecting working tools to said auxiliary frame comprising a tool bar element of substantially V-shape adapted to be connected to the auxiliary frame and along which working tools are connected whereby the tools will be alined to follow the hollowed space between plant rows.

8. In combination, a tractor, a cane cultivating attachment including a main tool-carrying structure pivoted to the tractor for vertical movement, an auxiliary frame connected to said main frame for free lateral movement to follow hollowed space between plant rows, a tool bar of substantially V-shape fixed to said auxiliary frame with its apex extending downwardly, and working tools fixed to the tool bar at both sides of the apex, whereby the tools will be alined to follow the hollowed space between plant rows.

9. In combination, a tractor, a cane cultivating attachment including a main tool-carrying structure pivoted to the tractor for vertical movement, an auxiliary frame connected to said main frame for free lateral movement to follow hollowed space between plant rows, a tool bar of V-shape and of square cross section, means for fixing said bar to said auxiliary frame with its apex and legs thereof to extend downwardly comprising spaced bracket members having squared openings through portions thereof which are angled to be perpendicular with respect to the respective legs, legs of the tool bar passing through the squared openings, and working tools fixed to the tool bar at both sides of the apex, whereby the tools will be alined to follow the hollowed space between plant rows.

10. In a cultivating attachment, a tool-carrying frame adapted to follow in the space between plant rows, a tool bar of V-shape and of square cross-section, means for fixing said bar to said frame with its apex and legs extending downwardly comprising spaced bracket members attachable to the frame at the respective sides thereof, said bracket members having portions angled to be perpendicular with respect to the respective legs of the V-shaped tool bar, and said portions having squared openings to receive and retain the squared legs of the V-shaped tool bar, whereby when said brackets are attached to said frame the tool bar will be rigidly held against lateral and vertical displacement.

JAMES MORKOSKI.